United States Patent
Miyamaru

(10) Patent No.: US 10,977,032 B2
(45) Date of Patent: Apr. 13, 2021

(54) ASSISTANCE DEVICE, DESIGN ASSISTANCE METHOD AND PROGRAM

(71) Applicant: Mitsubishi Electric Corporation, Tokyo (JP)

(72) Inventor: Takuya Miyamaru, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/755,598

(22) PCT Filed: Dec. 25, 2017

(86) PCT No.: PCT/JP2017/046454
§ 371 (c)(1),
(2) Date: Apr. 13, 2020

(87) PCT Pub. No.: WO2019/130396
PCT Pub. Date: Jul. 4, 2019

(65) Prior Publication Data
US 2020/0394022 A1 Dec. 17, 2020

(51) Int. Cl.
*G06F 9/44* (2018.01)
*G06F 8/76* (2018.01)
(Continued)

(52) U.S. Cl.
CPC .............. *G06F 8/76* (2013.01); *G05B 19/056* (2013.01); *G06F 8/20* (2013.01); *G06F 8/35* (2013.01);
(Continued)

(58) Field of Classification Search
CPC .. G06F 30/331; G06F 3/0607; G06F 15/7867; G06F 9/45558; G06F 8/30;
(Continued)

(56) References Cited

U.S. PATENT DOCUMENTS 9,652,225 B1 * 5/2017 Bohn ..................... G06F 8/30
2004/0123258 A1 * 6/2004 Butts ................... G06F 30/331
716/106
(Continued)

FOREIGN PATENT DOCUMENTS

CN 103547993 A 1/2014
JP 07-114516 A 5/1995
(Continued)

OTHER PUBLICATIONS

International Search Report and Written Opinion dated Mar. 6, 2018 for PCT/JP2017/046454 filed on Dec. 25, 2017, 6 pages including English Translation of the International Search Report.
(Continued)

*Primary Examiner* — Tuan A Vu
(74) *Attorney, Agent, or Firm* — Xsensus LLP

(57) ABSTRACT

A design assistance device assists design of a processing device to execute processing and includes an acquirer, divider, communication code generator, and outputter. The acquirer acquires processing code describing content of the processing. The divider divides the processing code into modules and determines, for each of the modules, an execution environment in which the module is to be executed, from among a plurality of execution environments provided on the processing device. The communication code generator generates, when a module of the plurality of modules includes partial processing prioritized for execution in a second execution environment other than a first execution environment determined for execution of the module, a communication code for communication between the first execution environment and the second execution environment to execute the partial processing in the second execution environment. The outputter outputs the plurality of
(Continued)

modules and the communication code to the processing device.

17 Claims, 14 Drawing Sheets

(51) Int. Cl.
  *G05B 19/05* (2006.01)
  *G06F 8/20* (2018.01)
  *G06F 8/35* (2018.01)
  *G06F 8/51* (2018.01)
  *G06F 9/48* (2006.01)
  *G06Q 10/06* (2012.01)
  *G06Q 50/04* (2012.01)

(52) U.S. Cl.
  CPC .............. *G06F 8/51* (2013.01); *G06F 9/4881* (2013.01); *G05B 2219/13004* (2013.01); *G06Q 10/0631* (2013.01); *G06Q 50/04* (2013.01)

(58) Field of Classification Search
  CPC ..... G06F 8/76; G06F 8/35; G06F 8/41; H04L 41/5054
  See application file for complete search history.

(56) References Cited

U.S. PATENT DOCUMENTS

| 2008/0184243 A1 | 7/2008 | Otsuki et al. |
| 2015/0095919 A1* | 4/2015 | Vincent ............... G06F 9/45558 718/104 |
| 2016/0139944 A1* | 5/2016 | Rouwet ............... G06F 9/45558 718/1 |
| 2018/0089132 A1* | 3/2018 | Atta ..................... G06F 15/7867 |
| 2018/0095670 A1* | 4/2018 | Davis ................... G06F 3/0607 |
| 2018/0139110 A1* | 5/2018 | Johnson .............. H04L 41/5054 |

FOREIGN PATENT DOCUMENTS

| JP | 2004-264914 A | 9/2004 |
| JP | 2008-165342 A | 7/2008 |
| JP | 2008-186357 A | 8/2008 |
| JP | 2009-098872 A | 5/2009 |
| JP | 2011-198027 A | 10/2011 |
| JP | 2012-118715 A | 6/2012 |
| JP | 2016-170707 A | 9/2016 |

OTHER PUBLICATIONS

Notification of Reasons for Refusal received for Japanese Patent Application No. 2018-530163, dated Jun. 26, 2018, 4 pages including English Translation.

Notification of Decision to Grant a Patent received for Japanese Patent Application No. 2018-530163, dated Nov. 13, 2018, 5 pages including English Translation.

Korean Office Action dated Aug. 19, 2020 in Korean patent application No. 10-2020-7017751.

Office Action dated Dec. 18, 2020 in Chinese Patent Application No. 201780097854.8, 18 pages.

* cited by examiner

FIG.8

| EXECUTION ENVIRONMENT SELECTION TABLE | | | |
|---|---|---|---|
| LIBRARY NAME | OS | PROCESSOR | EXECUTION ENVIRONMENT |
| MOTION CONTROL LIBRARY | OS1 | Pr1 | 21a |
| I/O ACCESS LIBRARY | OS1 | Pr1 | 21a |
| COMMUNICATION LIBRARY | OS2 | Pr2 | 21b |
| DATABASE LIBRARY | OS2 | Pr2 | 21b |
| WEB SERVER LIBRARY | OS2 | Pr2 | 21b |
| GUI LIBRARY | OS3 | Pr3 | 21c |
| FORM GENERATION LIBRARY | OS3 | Pr3 | 21c |
| AI LIBRARY | OS3 | Pr4 | 21d |
| DATA ANALYSIS LIBRARY | OS3 | Pr4 | 21d |

FIG.9

| COMMUNICATION METHOD SELECTION TABLE ||
|---|---|
| LIBRARY NAME | COMMUNICATION METHOD |
| MOTION CONTROL LIBRARY | SHARED MEMORY |
| I/O ACCESS LIBRARY | SHARED MEMORY |
| COMMUNICATION LIBRARY | UDP |
| DATABASE LIBRARY | TCP |
| WEB SERVER LIBRARY | TCP |
| GUI LIBRARY | UDP |
| FORM GENERATION LIBRARY | FTP |
| AI LIBRARY | SPECIFIC PROTOCOL |
| DATA ANALYSIS LIBRARY | FTP |

FIG.10

| LIBRARY USAGE FOR EACH MODULE | |
|---|---|
| LIBRARY NAME | FREQUENCY OF USE (INDEX VALUE) |
| MOTION CONTROL LIBRARY | 0 |
| I/O ACCESS LIBRARY | 6 |
| COMMUNICATION LIBRARY | 0 |
| DATABASE LIBRARY | 3 |
| WEB SERVER LIBRARY | 0 |
| GUI LIBRARY | 2 |
| FORM GENERATION LIBRARY | 0 |
| AI LIBRARY | 0 |
| DATA ANALYSIS LIBRARY | 0 |

FIG.11

| LIBRARY USAGE FOR EACH MODULE ||
|---|---|
| LIBRARY NAME | FREQUENCY OF USE (INDEX VALUE) |
| MOTION CONTROL LIBRARY | 0 |
| I/O ACCESS LIBRARY | 10 |
| COMMUNICATION LIBRARY | 0 |
| DATABASE LIBRARY | 0 |
| WEB SERVER LIBRARY | 0 |
| GUI LIBRARY | 0 |
| FORM GENERATION LIBRARY | 0 |
| AI LIBRARY | 0 |
| DATA ANALYSIS LIBRARY | 0 |

FIG.12

| LIBRARY USAGE FOR EACH MODULE ||
|---|---|
| LIBRARY NAME | FREQUENCY OF USE (INDEX VALUE) |
| MOTION CONTROL LIBRARY | 7 |
| I/O ACCESS LIBRARY | 10 |
| COMMUNICATION LIBRARY | 0 |
| DATABASE LIBRARY | 0 |
| WEB SERVER LIBRARY | 0 |
| GUI LIBRARY | 0 |
| FORM GENERATION LIBRARY | 0 |
| AI LIBRARY | 0 |
| DATA ANALYSIS LIBRARY | 0 |

FIG.14

| EXECUTION ENVIRONMENT SELECTION TABLE ||||| 
|---|---|---|---|---|
| LIBRARY NAME | OS | PROCESSOR | EXECUTION ENVIRONMENT | WEIGHTING FACTOR |
| MOTION CONTROL LIBRARY | OS1 | Pr1 | 21a | 1.2 |
| I/O ACCESS LIBRARY | OS1 | Pr1 | 21a | 1.0 |
| COMMUNICATION LIBRARY | OS2 | Pr2 | 21b | 2.0 |
| DATABASE LIBRARY | OS2 | Pr2 | 21b | 1.5 |
| WEB SERVER LIBRARY | OS2 | Pr2 | 21b | 1.1 |
| GUI LIBRARY | OS3 | Pr3 | 21c | 3.8 |
| FORM GENERATION LIBRARY | OS3 | Pr3 | 21c | 2.3 |
| AI LIBRARY | OS3 | Pr4 | 21d | 4.0 |
| DATA ANALYSIS LIBRARY | OS3 | Pr4 | 21d | 4.1 |

US 10,977,032 B2

ASSISTANCE DEVICE, DESIGN ASSISTANCE METHOD AND PROGRAM

CROSS-REFERENCE TO RELATED APPLICATIONS

The present application is based on PCT filing PCT/JP2017/046454, filed Dec. 25, 2017, the entire contents of which are incorporated herein by reference.

TECHNICAL FIELD

The present disclosure relates to a design assistance device, a design assistance method and a program.

BACKGROUND ART

In recent years, a computer provided with multiple execution environments by inclusion of multiple OSs and multiple processors is often used as a controller such as a programmable logic controller (PLC). This requires a designer to take into consideration characteristics of each execution environment such as available libraries and operating performance in designing applications that operate in each environment, rendering design work complicated.

To address a difference in execution environments, a method for automatically changing a discrepancy in source code derived from the difference in execution environments is proposed (refer to Patent Literature 1, for example). Patent Literature 1 discloses a device that processes a generated source code based on a processing rule corresponding to a platform to be used and outputs a source code corresponding to the platform.

CITATION LIST

Patent Literature

Patent Literature 1: Unexamined Japanese Patent Application Kokai Publication No. 2008-165342

SUMMARY OF INVENTION

Technical Problem

However, the technique disclosed in Patent Literature 1 is directed to changing of the source code for operation of the source code on one platform to be used. Therefore, application to a computer including a plurality of execution environments is not considered, and if such a technique is applicable, factors require consideration such as which type of processing to use and what type of execution environment to use for execution of the processing, and the reduction in the burden imposed on the designer is insufficient.

The present disclosure is made in view of the above-described circumstances, and an objective of the present disclosure is to, in a system including a plurality of execution environments, facilitate design of applications.

Solution to Problem

In order to achieve the aforementioned objective, the present disclosure provides a design assistance device that assists designing for causing a processing device to execute processing, the design assistance device including:

acquisition means for acquiring a processing code describing content of the processing;

dividing means for dividing the processing code into a plurality of modules and determining, for each of the plurality of modules, an execution environment in which the corresponding module is to be executed, from among a plurality of execution environments provided on the processing device;

communication code generation means for generating, when a module of the plurality of modules includes partial processing prioritized for execution in a second execution environment other than a first execution environment determined for execution of the module, a communication code for communication between the first execution environment and the second execution environment to execute the partial processing in the second execution environment; and output means for outputting the plurality of modules and the communication code to the processing device.

Advantageous Effects of Invention

The present disclosure includes determining, for each of the plurality of modules into which the processing code is divided, an execution environment in which the corresponding module is to be executed, from among the plurality of execution environments provided on the processing device, and generating, when a module of the plurality of modules includes partial processing prioritized for execution in the second execution environment other than the first execution environment determined for execution of the module, a communication code for causing execution of the partial processing in the second execution environment. This achieves distribution of the modules included in the processing code to the plurality of execution environments and also achieves execution of the partial processing included in the module in an execution environment that is more suitable. Such configuration allows a designer to design applications in a system including a plurality of execution environments without taking into consideration differences between the execution environments, thereby facilitating the design of applications.

BRIEF DESCRIPTION OF DRAWINGS

FIG. 8 illustrates an example of an execution environment selection table according to the embodiment;

FIG. 9 illustrates an example of a communication method selection table according to the embodiment;

FIG. 10 is a first diagram illustrating an example of module-specific library usage according to the embodiment;

FIG. 11 is a second diagram illustrating another example of module-specific library usage according to the embodiment;

FIG. 12 is a third diagram illustrating yet another example of module-specific library usage according to the embodiment;

FIG. 14 illustrates a modified example of the execution environment selection table according to the embodiment, the table being designed on the basis of the weighted sums.

DESCRIPTION OF EMBODIMENTS

Hereinafter a processing system 1000 according to an embodiment of the present disclosure is described in detail with reference to the drawings.

Embodiment

Figure 1:
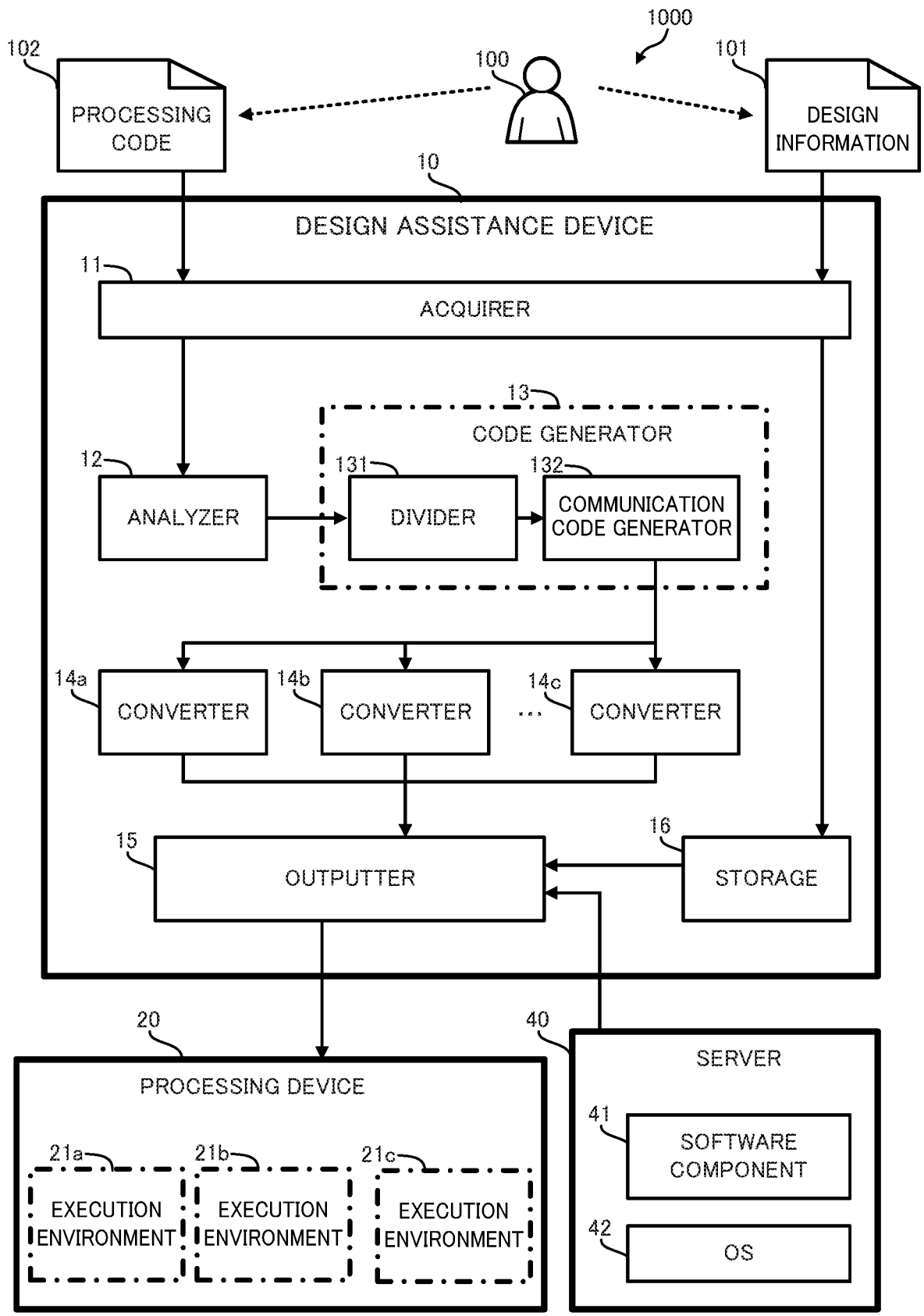
FIG. 1 is a block diagram of a processing system according to an embodiment of the present disclosure.

FIG. 1 schematically illustrates the processing system 1000 according to the present embodiment. The processing system 1000 is a production system constructed in a factory and executes, to produce products, a series of production processing by use of machines such as a material processing device, a reflow furnace and a belt conveyor. A processing device 20 that controls a large number of production machines executes desired processing designed by a user 100, thereby achieving such production processing. The processing system 1000 is not limited to such configuration, and may be installed in facilities other than a factory or may be a system other than a production system.

The processing system 1000 includes a design assistance device 10 that assists designing of an application program for causing the processing device 20 to execute specific processing, the processing device 20 that includes a processor and on which a plurality of execution environments is to be provided, and a server 40 that is referred to by the design assistance device 10. The design assistance device 10 and the processing device 20 are connected to each other via a dedicated line to achieve wired communication therebetween. The design assistance device 10 and the processing device 20 may communicate wirelessly to each other. The design assistance device 10 is connected to the server 40 via a network such as the Internet.

The design assistance device 10 is a device that causes the processing device 20, based on design information 101 that is pre-input by the user 100, to efficiently execute processing described in processing code 102 input by the user 100. As illustrated in FIG. 1, the design assistance device 10 functionally includes an acquirer 11 that acquires data input by the user 100, an analyzer 12 that analyzes the input processing code 102, a code generator 13 that generates codes to be actually executed by the processing device 20, converters 14a, 14b and 14c that convert the generated codes into a format suitable for execution, an outputter 15 that output the codes to the processing device 20, and a storage 16 that stores the design information 101.

The acquirer 11 serves as user interface, and includes an input device that allows the user 100 to input information and an output device that presents information for the user. The acquirer 11 may include, to read data specified by the user from an external storage device, a terminal or a communication interface circuit. Furthermore, the acquirer 11 may be a communication interface circuit that does not function as the user interface and communicates with an external user interface terminal. The acquirer 11 acquires the design information 101 input by the user 100 and stores the design information 101 in the storage 16. Details of the design information 101 are described later. The acquirer 11 further acquires the processing code 102 input by the user 100 and outputs the processing code 102 to the analyzer 12. The processing code 102 is a source code that describes content of an application program to be executed by the processing device 20. A designer designs processing described in the processing code 102. The processing code 102 is not limited to the source code, and may be other code or may include data. The acquirer 11 functions as acquisition means in the claims.

Figure 2:
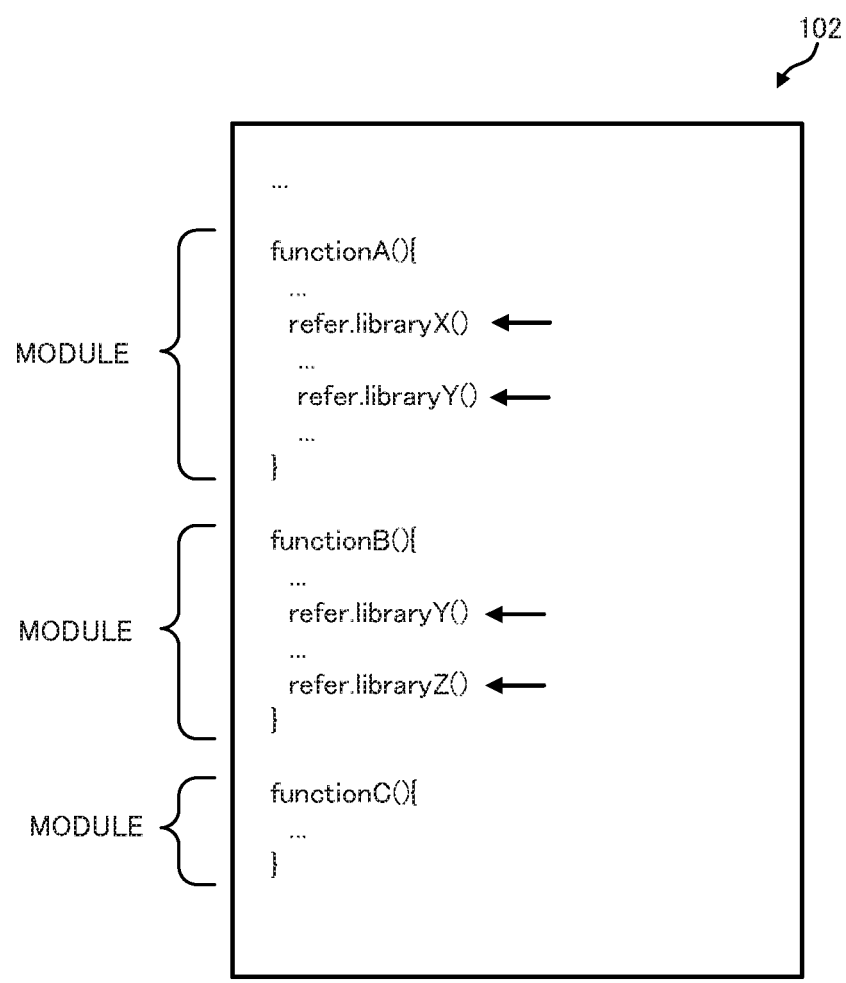
FIG. 2 illustrates an example of a processing code according to the embodiment.

The analyzer 12 reads the processing code 102, analyzes the processing code 102, and outputs an analysis result. Specifically, the analyzer 12 analyzes a plurality of modules included in the processing code 102, and obtains, for each module, an index to be used for assigning the corresponding module to one of a plurality of execution environments provided on the processing device 20. More specifically, the analyzer 12 deals with functions included in the processing code 102 as modules, and counts, as an index, for each of the modules, a number of times each library referenced to in the module is used. Since the execution environment suitable for execution of a library differs depending on a type of the library, numbers of times libraries are used in executing processing described in a module can be an index for assigning the module to one of the execution environments. FIG. 2 illustrates examples of functions as the modules included in the processing code 102, and the arrow symbols indicate lines of functions that refer to libraries. The modules are not limited to functions, and may be other modules.

Here, each of the execution environments provided on the processing device 20 is an environment in which programs are executed, and combinations of an Operating System (OS) and a processor serve as the execution environments. That is to say, a plurality of OSs operates simultaneously in the processing device 20, and a processor executing the OS executes applications and programs on the OS. When different OSs are executed simultaneously by one processor, such OSs form different execution environments. An OS executed by different processors is to form, although the OS executed by each processor is substantially equal in this case, different execution environments. The execution environment is also called as a platform.

The libraries are external programs called and used by the processor that executes the processing described in the processing code 102. The processing code 102 does not describe specific contents of the libraries and instead describes identifiers, names or addresses of the libraries to be used for calling the libraries. The libraries may be included in the OSs or may be provided from the exterior as software components 41 described in detail later.

Again with reference to FIG. 1, the code generator 13 includes a divider 131 that divides the processing code 102 and a communication code generator 132 that generates communication codes.

Figure 3:
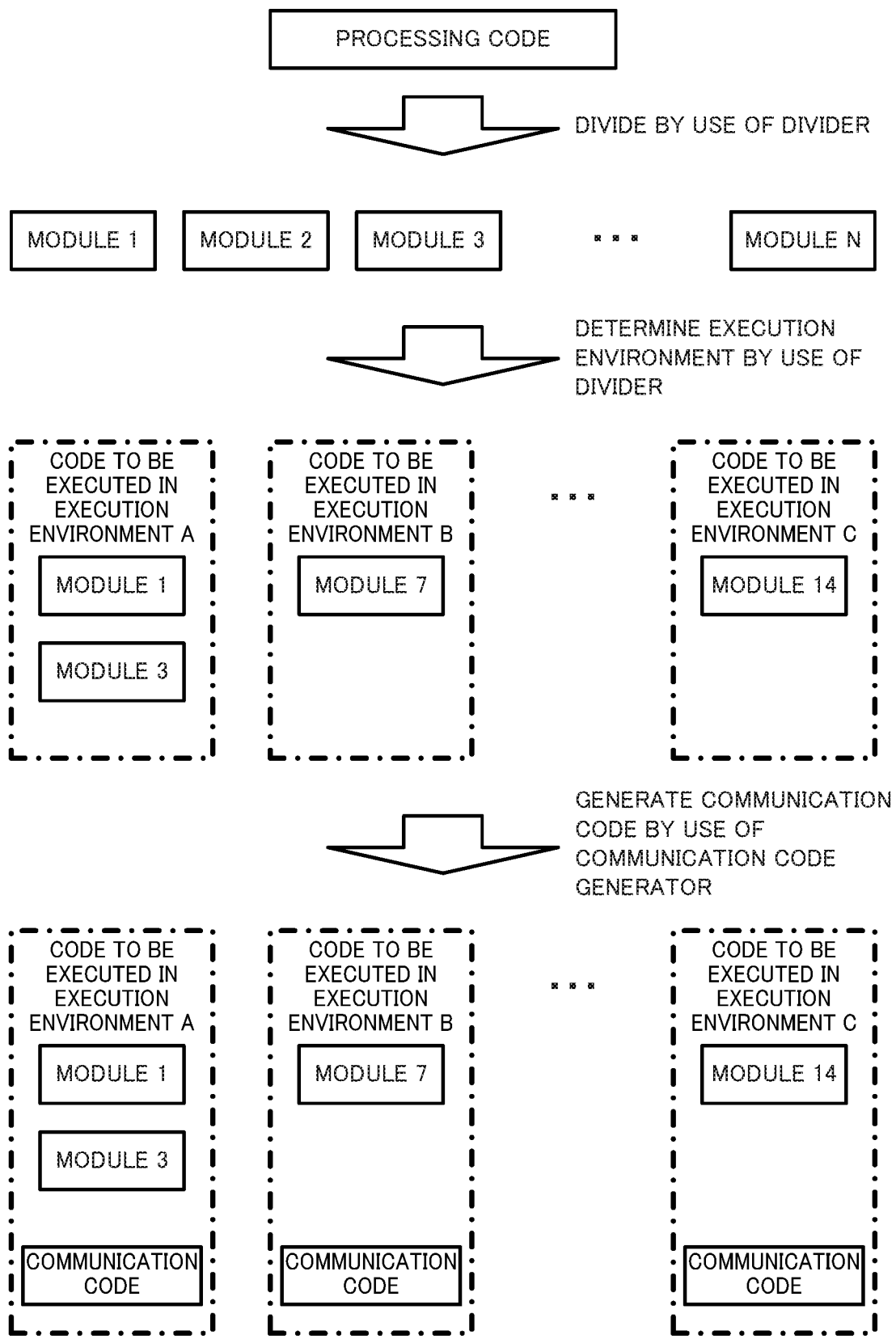
FIG. 3 illustrates a flow of dividing the processing code, determining execution environments and generating communication codes according to the embodiment.

As illustrated in FIG. 3, the divider 131 divides the processing code 102 into a plurality of modules and determines, based on the analysis result obtained by the analyzer 12, for each of the plurality of modules obtained by dividing the processing code 102, an execution environment in which the corresponding module is to be executed, from among the plurality of execution environments provided on the processing device 20. The divider 131 according to the present embodiment determines an execution environment suitable for a library that is most frequently used in a module as the execution environment for executing the module. Correspondence relationships between the execution environments and the libraries are specified in the design information 101. The divider 131 functions as dividing means in the claims.

As illustrated in FIG. 3, the communication code generator 132 generates communication codes. Although an execution environment in which a module is to be executed is determined to be one execution environment of the plurality of execution environments, executing all the processing included in the module in this execution environment (which is a "first execution environment") is sometimes inefficient, or sometimes all of the modules cannot be executed in the first execution environment. Thus, when the module of the plurality of modules includes partial processing prioritized for execution in an execution environment (which is a "second execution environment") other than the determined first execution environment, the communication code generator 132 generates a communication code for causing execution of such partial processing in the second execution environment. The partial processing is processing that uses a library designed in the design information 101 as a library to be executed in the second execution environment. The communication code includes information specifying partial processing that is included in the module and to be executed in the second execution environment. The communication code is source code that achieves communication between the first execution environment and the second execution environment and execution of the specified partial processing in the second execution environment, and includes specification of a communication method described later and description of a wrapper function. Combination of the module and the communication code enables execution of the majority of the module in the first execution environment and execution of the partial processing in the second execution environment. The communication code generator 132 functions as communication code generation means in the claims.

Again with reference to FIG. 1, each of the converters 14a, 14b and 14c corresponds to the corresponding one of the plurality of execution environments provided on the processing device 20. Hereinafter the converters 14a, 14b and 14c are collectively termed and referred to as a converter 14. The converter 14 acquires from the code generator 13 the modules and the communication codes each to be executed in the corresponding execution environment, and converts the modules and the communication codes into executable formats. The converter 14 according to the present embodiment is a compiler that generates an object code from a source code. Hereinafter a code directly executed by the processing device 20 is referred to as an executable file. The modules and the communication codes output from the converter 14 correspond to the executable file. The converter 14 functions as conversion means in the claims.

The outputter 15 outputs the plurality of modules and the plurality of communication codes to the processing device 20. During such outputting, the outputter 15 reads the design information 101 stored in the storage 16 and acquires, from the server 40, software components for execution by the processing device 20 of the codes output from the converter 14 and image files of the OSs, based on the content specified by the user 100. The outputter 15 provides the plurality of execution environments on the processing device 20 and arranges, in each of the plurality of execution environments, the module, the communication code, the software component and the OS. Specifically, the outputter 15 outputs information specifying a processor for providing each execution environment and also outputs a control order ordering the providing of the execution environments while outputting the software components and the OSs that are used for providing the execution environments, thereby allowing the processing device 20 to provide the plurality of execution environments. Furthermore, the outputter 15 causes the processing device 20 to execute the executable files that each include the module and the communication code. The outputter 15 functions as output means in the claims.

Figure 4:
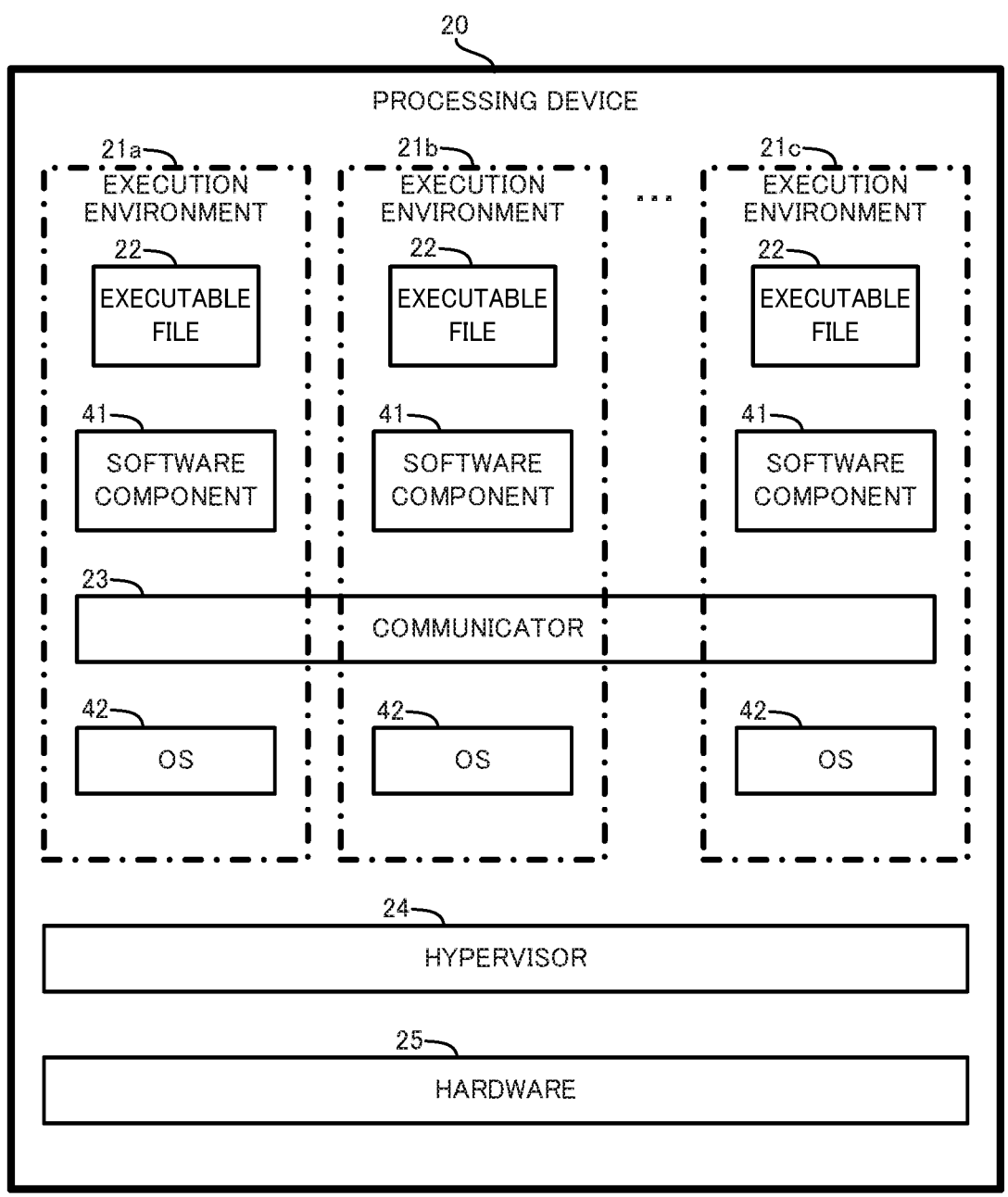
FIG. 4 illustrates a configuration of a processing device according to the embodiment.

As illustrated in FIG. 4, the outputter 15 provides a plurality of execution environments 21a, 21b, and 21c on the processing device 20. Each of the execution environments 21a, 21b, and 21c includes an executable file 22 in which one or more modules are collected, a software component 41 and an OS 42 that are downloaded from the server 40, and a communicator 23 that is achieved by execution of the communication codes and used for communications among the execution environments. Although FIG. 4 illustrates the executable files 22 and the communicator 23 separately, the communicator 23 functions by execution of the communication codes included in the executable files 22. The execution environments 21a, 21b, and 21c are formed on a hypervisor 24 of the processing device 20. The hypervisor 24 is achieved by corporation of hardware 25 of the processing device 20.

Figure 5:
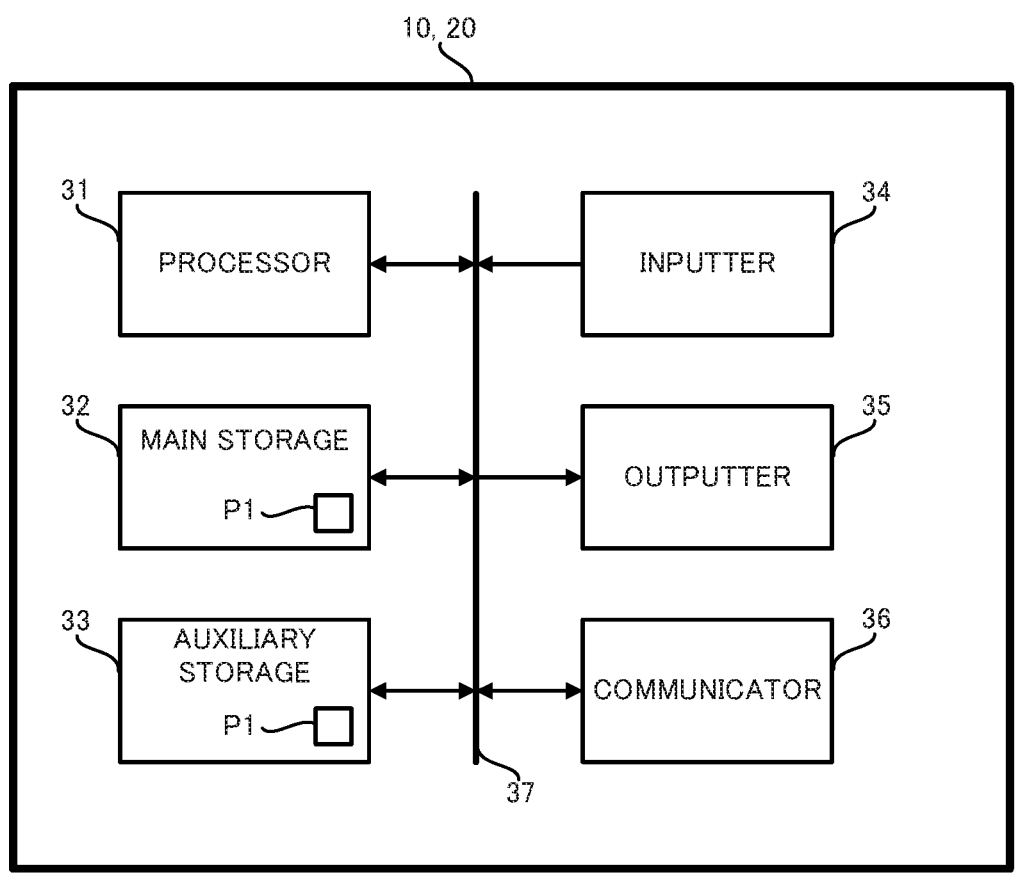
FIG. 5 illustrates a hardware configuration of a design assistance device and the processing device according to the embodiment.

FIG. 5 illustrates an example of a hardware configuration of the design assistance device 10 and the processing device 20. As illustrated in FIG. 5, the design assistance device 10 and the processing device 20 are configured as a computer device that includes a processor 31, a main storage 32, an auxiliary storage 33, an inputter 34, an outputter 35 and a communicator 36. The main storage 32, the auxiliary storage 33, the inputter 34, the outputter 35 and the communicator 36 are connected to the processor 31 via an internal bus 37.

The processor 31 includes a Central Processing Unit (CPU) or a Micro Processing Unit (MPU). The processor 31 executes a program P1 stored in the auxiliary storage 33 to achieve various functions and executes processing described later.

The main storage 32 includes a Random Access Memory (RAM). A program P1 is loaded from the auxiliary storage part 33 into the main storage 32. The main storage 32 is used by the processor 31 as a work area.

The auxiliary storage 33 includes a nonvolatile memory such as a hard disk and a flash memory. The auxiliary storage 33 stores the program P1 and various data to be used for processing by the processor 31. The auxiliary storage 33 supplies, in accordance with instructions from the processor 31, to the processor 31 the data to be used by the processor 31 and stores data supplied from the processor 31.

The inputter 34 includes an input device such as input keys and a pointing device. The inputter 34 acquires information input by the user 100 and sends notification of the acquired information to the processor 31.

The outputter 35 includes an output device such as a Liquid Crystal Display (LCD) and a speaker. The outputter 35 presents, in accordance with instructions from the processor 31, various information for the user of the design assistance device 10 and the processing device 20.

The communicator 36 includes a Network Interface Controller (NIC) for communicating with an external device. The communicator 36 receives a signal from the external device and outputs data included in the signal to the processor 31. Furthermore, the communicator 36 transmits to the external device a signal indicating data output from the processor 31.

Figure 6:
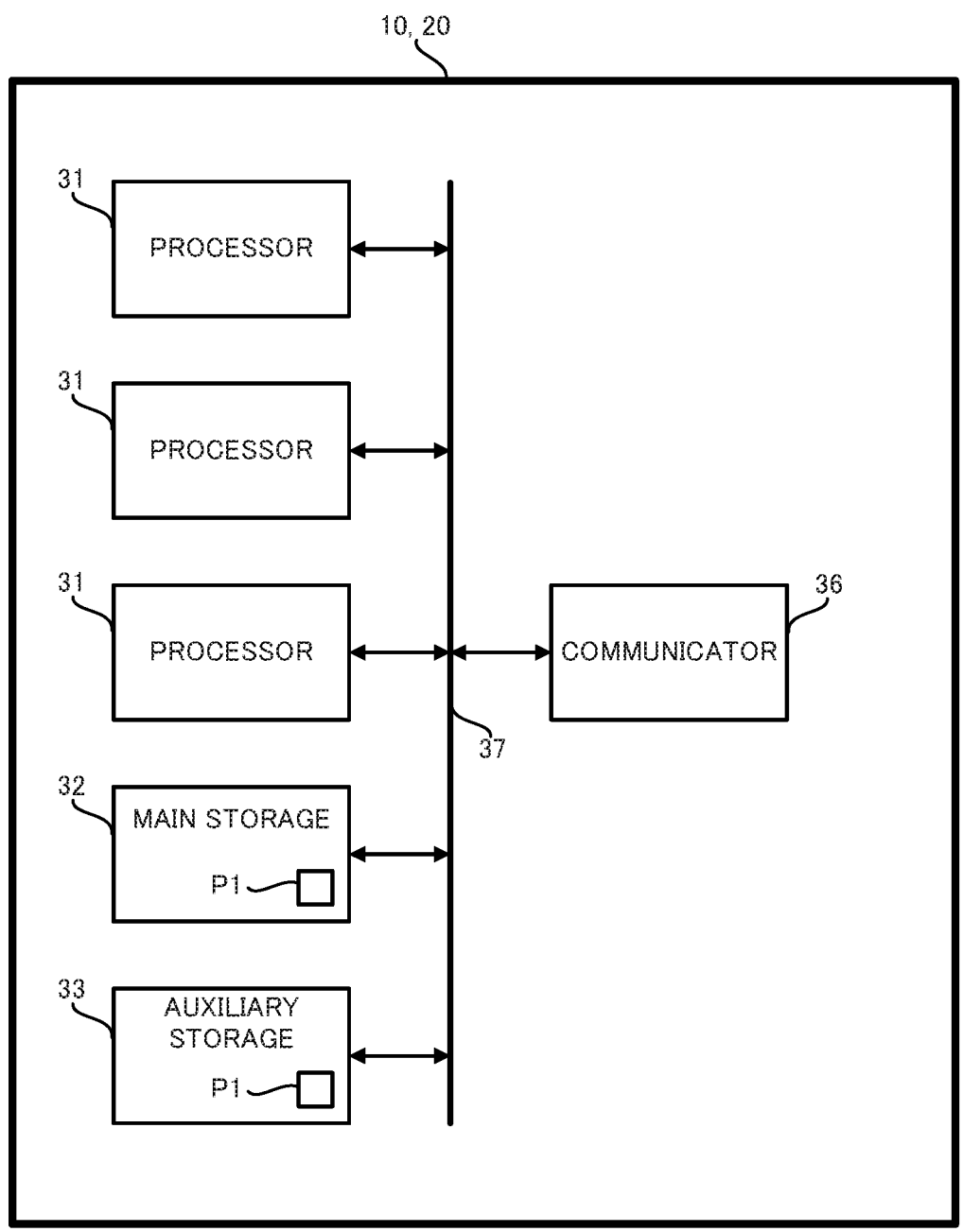
FIG. 6 illustrates a modified example of the hardware configuration of the design assistance device and the processing device.

The inputter 34 and the outputter 35 may be omitted from the design assistance device 10 and the processing device 20, as illustrated in FIG. 6. When the inputter 34 and the outputter 35 are omitted, employing a configuration in which the communicator 36 communicates with the external user interface terminal, in place of the inputter 34 and the outputter 35, leads to achievement of the functions of the inputter 34 and the outputter 35.

FIG. 5 illustrates an example of employing one processor 31. The plurality of execution environments as illustrated in FIG. 4 can be provided even when the number of the processors 31 of the processing device is one. The design assistance device 10 and the processing device 20 may include a plurality of the processors 31 as illustrated in FIG. 6, and the plurality of execution environments may be achieved by the plurality of processors in the processing device 20 each corresponding to one execution environment.

The processors 31 of FIGS. 5 and 6 execute the program P1 to allow cooperation among hardware components, thereby achieving the functions of the design assistance device 10 of FIG. 1. Hereinafter details of such configuration are described with reference to FIG. 5 as an example. The acquirer 11 of FIG. 1 is mainly achieved via the inputter 34 and the outputter 35 of FIG. 5. The functions of the analyzer 12, the code generator 13, and the converter 14 are mainly achieved by the processor 31. The outputter 15 is achieved mainly by the processor 31 and the communicator 36. The storage 16 is mainly achieved via the auxiliary storage 33.

Figure 7:
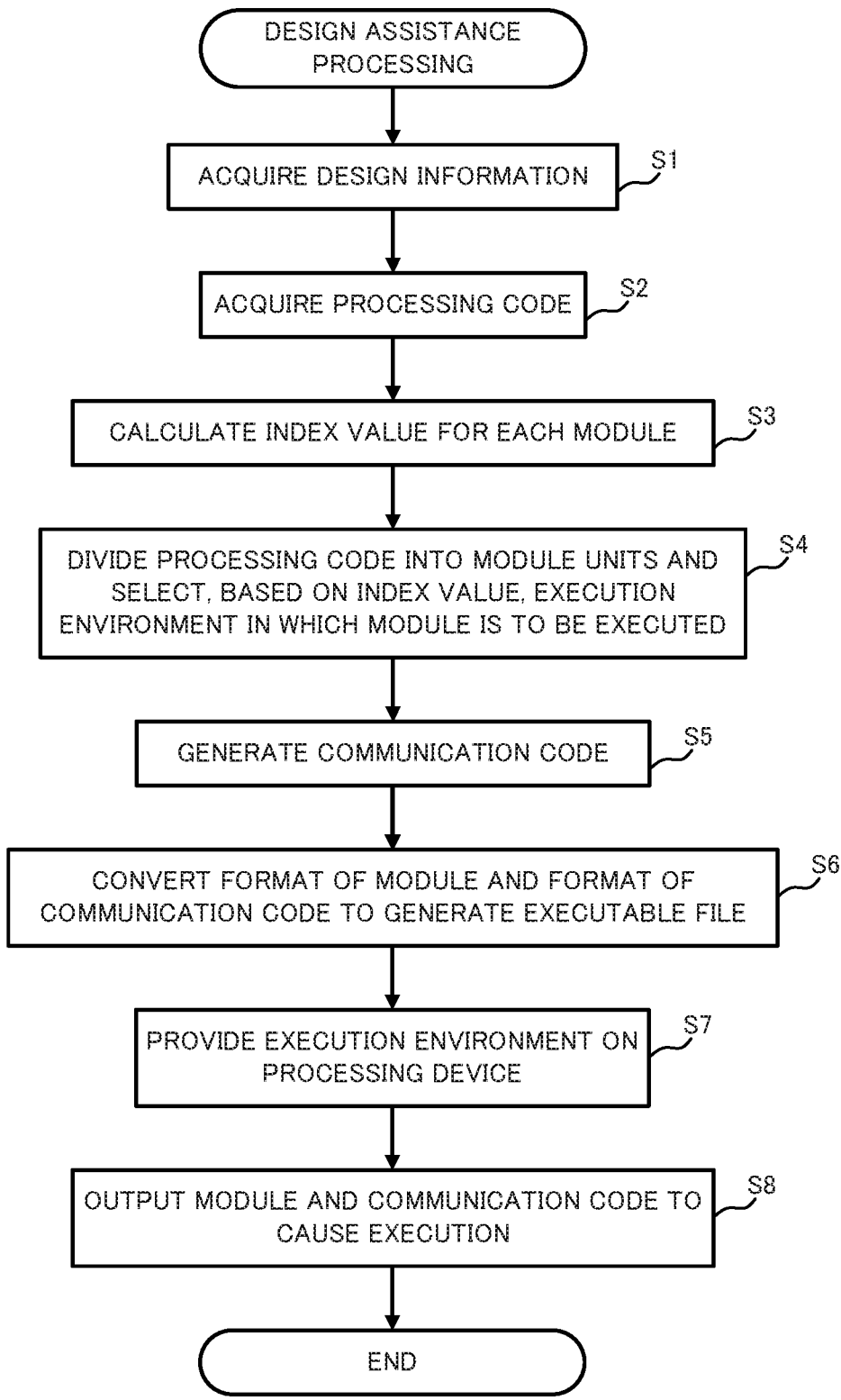
FIG. 7 is a flowchart of design assistance processing according to the embodiment.

Next, processing executed by the design assistance device 10 is described in detail with reference to FIGS. 6-12. When the user causes execution of the program P1 (refer to FIGS. 5 and 6), the design assistance device 10 starts design assistance processing as illustrated in FIG. 7.

In the design assistance processing, the design assistance device 10 acquires the design information 101 from the user 100 (step S1). Specifically, the acquirer 11 asks the user 100 to input the design information 101, acquires the design information 101, and stores the design information 101 in the storage 16.

The design information 101 includes an execution environment selection table, an example of which is illustrated in FIG. 8, and a communication method selection table, an example of which is illustrated in FIG. 9.

The execution environment selection table is a table that is used to select execution environments, and as illustrated in FIG. 8, a library name, an OS of an execution environment suitable for the library, a processor of the execution environment suitable for the library, and an identifier of the execution environment suitable for the library are associated with one another. For example, the first line of the execution environment selection table of FIG. 8 indicates that an environment suitable for execution of a "motion control library" is the execution environment 21a in which "OS1" is the OS and "Pr1" is the processor. The identifiers 21a-21c of FIG. 8 correspond to the reference signs 21a-21c of FIG. 1.

The communication method selection table is a table that is used to select a communication method for execution of a library used in a part of a module in an execution environment different from an execution environment employed for execution of the module. In the communication method selection table, as illustrated in FIG. 9, a library name and a communication method for execution of the corresponding library are associated with each other. For example, the first line of the table of FIG. 9 indicates that a communication method using a "shared memory" is to be employed for achievement of communication between the execution environments. As FIG. 8 specifies that the "motion control library" is executed in the execution environment 21a, communication from another execution environment to the execution environment 21a is performed to use the "motion control library" and execute the "motion control library" in the execution environment 21a.

The user 100 specifies beforehand, for each of various libraries, an OS and a processor as configurations of an execution environment in which the corresponding library is used, and also specifies beforehand communication methods to be employed for achieving communications between the execution environments, as illustrated in the execution environment selection table and the communication method selection table.

Again with reference to FIG. 7, following step S1, the design assistance device 10 acquires the processing code 102 (step S2). Specifically, the acquirer 11 asks the user to input the processing code 102 to acquire the processing code 102.

Next, the design assistance device 10 calculates, for each module, index values used to determine an execution environment in which the corresponding module is to be executed (step S3). Specifically, the analyzer 12 reads the modules included in the processing code 102 and counts, for each module, numbers of times libraries are used, as the index values. FIG. 10 illustrates examples of the index values calculated for one module according to the present embodiment. In this example, the index values, which include numbers of times for each of nine types of libraries, correspond to vector values. Such index values are calculated for each module.

Next, the design assistance device 10 divides the processing code 102 into module units and selects, based on the index values, for each module, an execution environment in which the corresponding module is executed (step S4). Specifically, the divider 131 determines, for each module, an execution environment in which the corresponding module is executed, based on the index value of the module. Referring to the index values of FIG. 10, the number of times the "I/O access library" is used is the largest. Additionally, referring to the execution environment selection table of FIG. 8, the execution environment 21a is specified as an execution environment suitable for the "I/O access library". Thus, the divider 131 determines that the module, for which index values are calculated as illustrated in FIG. 10, is to be executed in the execution environment 21a. In this manner, the divider 131 reads the execution environment selection table from the storage 16 and selects an execution environment suitable for a most-frequently-used library.

Next, the design assistance device 10 generates communication codes (step S5). As described above, the module, for which index values are calculated as illustrated in FIG. 10, is determined to be executed in the execution environment 21a. In this module, a "database library" and a "GUI library" are also used in addition to the "I/O access library". However, the execution environment selection table of FIG. 8 specifies that the "database library" is used in the execution environment 21b and the "GUI library" is used in the execution environment 21c. Thus, the communication code generator 132 generates a communication code that includes description of communication processing between the execution environments and a wrapper function that are for using of the "database library" in the execution environment 21b while executing the module in the execution environment 21a, and also generates a communication code that includes description of communication processing between execution environments and a wrapper function that are for using the "GUI library" in the execution environment 21c while executing the module in the execution environment 21a.

Here, the communication method selection table of FIG. 9 specifies that Transmission Control Protocol (TCP) communication is employed for use of the "database library" in the execution environment 21b. Thus, the communication code generator 132 generates a communication code used for TCP communication between the execution environment 21a and the execution environment 21b. Furthermore, as seen in reference to FIG. 9, User Datagram Protocol (UDP) communication is employed for use of the "GUI library" in the execution environment 21c. Thus, the communication code generator 132 generates a communication code to be used for achievement of UDP communication between the execution environment 21a and the execution environment 21c.

When communication between an execution environment in which a module is executed and another execution environment is not required, the communication code generator 132 does not generate the communication code. For example, when index values of a module are calculated as illustrated in FIG. 11, only the "I/O access library" is used, and other libraries are not used in this module. Thus, all processing described in this module can be executed in the execution environment 21a that is suitable for the "I/O access library" (refer to FIG. 8). When index values of a module are calculated as illustrated in FIG. 12, the "motion control library" is used in addition to the "I/O access library". However, FIG. 8 specifies that both the "I/O access library" and the "motion control library" are to be executed in the execution environment 21a, and thus all processing described in this module can be executed in the execution environment 21a.

Again with reference to FIG. 7, following step S5, the design assistance device 10 converts the formats of the modules and the formats of the communication codes to generate executable files 22 that each collect the format-converted modules and communication codes (step S6). Specifically, the converter 14 compiles the modules and the communication codes.

Next, the design assistance device 10 provides the execution environments on the processing device 20 (step S7). Specifically, the outputter 15 refers to the execution environment selection table of FIG. 8, downloads from the server 40 software components and OSs as data to be used for providing the execution environments, and provides the execution environments on the processing device 20. For example, in order to check already-provided execution environments, the outputter 15 queries the processing device 20 to confirm whether each of the OSs specified in the execution environment selection table is executed by the corresponding processor. When an un provided execution environment exists, the outputter 15 downloads from the server 40 the newest version of OS to be used, and outputs the OS to the processing device 20. The outputter 15 further queries the processing device 20 to confirm whether the processing device 20 includes various processors specified in the execution environment selection table as hardware. When the processing device 20 does not include a processor included in the various processors as hardware, the outputter 15 downloads from the server 40 software components for emulating the processor on the processing device 20 after checking with the user 100.

Next, the design assistance device 10 outputs the modules and the communication codes to the processing device 20, and causes the processing device 20 to execute the processing described in the processing code 102 (step S8). Specifically, the outputter 15 arranges each of the executable files in the corresponding execution environment to cause execution of each of the executable files in the corresponding execution environment.

As described above, the divider 131 determines, for each of the plurality of modules obtained by dividing the processing code 102, an execution environment in which the corresponding module is executed, from among the plurality of execution environments. Furthermore, when a module of the plurality of modules includes partial processing prioritized for execution in an execution environment (which is a second execution environment) other than the execution environment determined for execution of the module (which is a first execution environment), the communication code generator 132 generates communication code for causing execution of this partial processing in the second execution environment. This achieves distribution of the modules included in the processing code 102 to the plurality of execution environments and also enables execution of partial processing included in the module in an execution environment that is more suitable. Thus, employment of the processing system 1000 allows the designer to design applications without taking into consideration differences between execution environments and facilitates design of applications. Furthermore, the efficiency of load distribution can be improved.

Furthermore, the divider 131 divides the processing code 102 and determines, for each of the plurality of modules, an execution environment in which the corresponding module is to be executed, based on the index value obtained from the content of the processing described in the module. This reduces the need by the user 100 to divide the processing code 102 and determine execution environments in which modules are to be executed, thereby allowing the user 100 to design applications without taking into consideration characteristics of the execution environments. Thus, the user 100 does not need to be skilled in development work. Further, development man-hours can be reduced.

The divider 131 according to the present embodiment determines, using a frequency of use of each library of a module as index values, an execution environment in which a most-frequently-used library is optimally executed as the execution environment in which the module is to be executed. Generally, the processing code 102 schematically describes processing, and processing that imposes a heavy load is achieved by use of libraries. Thus, selecting an execution environment according to the frequency of use of each library can be anticipated to execute a module in a suitable execution environment, and allow the user 100 to develop applications easily without taking into consideration characteristics of execution environments. The characteristics of the execution environments include characteristics of each OS, such as usable libraries, real-timeliness, and operating performance.

Furthermore, the communication code generator 132 generates a communication code. Specifically, the communication code generator 132 generates a communication code for communication via a communication method that is associated in the communication method selection table with a library used in performing the partial processing. This eliminates the need by the user 100 to generate a code that achieves cooperative processing among the execution environments. Thus, the user 100 does not need to be skilled in development work. Further, development man-hours can be reduced.

Furthermore, the outputter 15 prepares, as data to be used for execution of the executable files 22 by the processing device 20, the software components and the OSs. This eliminates the need by the user 100 to prepare the software components and the OSs and setting arrangement thereof. Thus, the user 100 does not need to be skilled in development work. Further, development man-hours can be reduced.

Although an embodiment of the present disclosure is described above, the present disclosure is not limited by the above-described embodiment.

For example, although the processing system 1000 according to the above-described embodiment is a production system installed in a factory, such configuration is not limiting. The processing system 1000 may be installed in public facilities such as a hospital and a school, a house, or an office building. Furthermore, the processing system 1000 may be a system different from a production system, that is, may be a processing system, an inspection system, a control system, or other processing systems.

Figure 13:
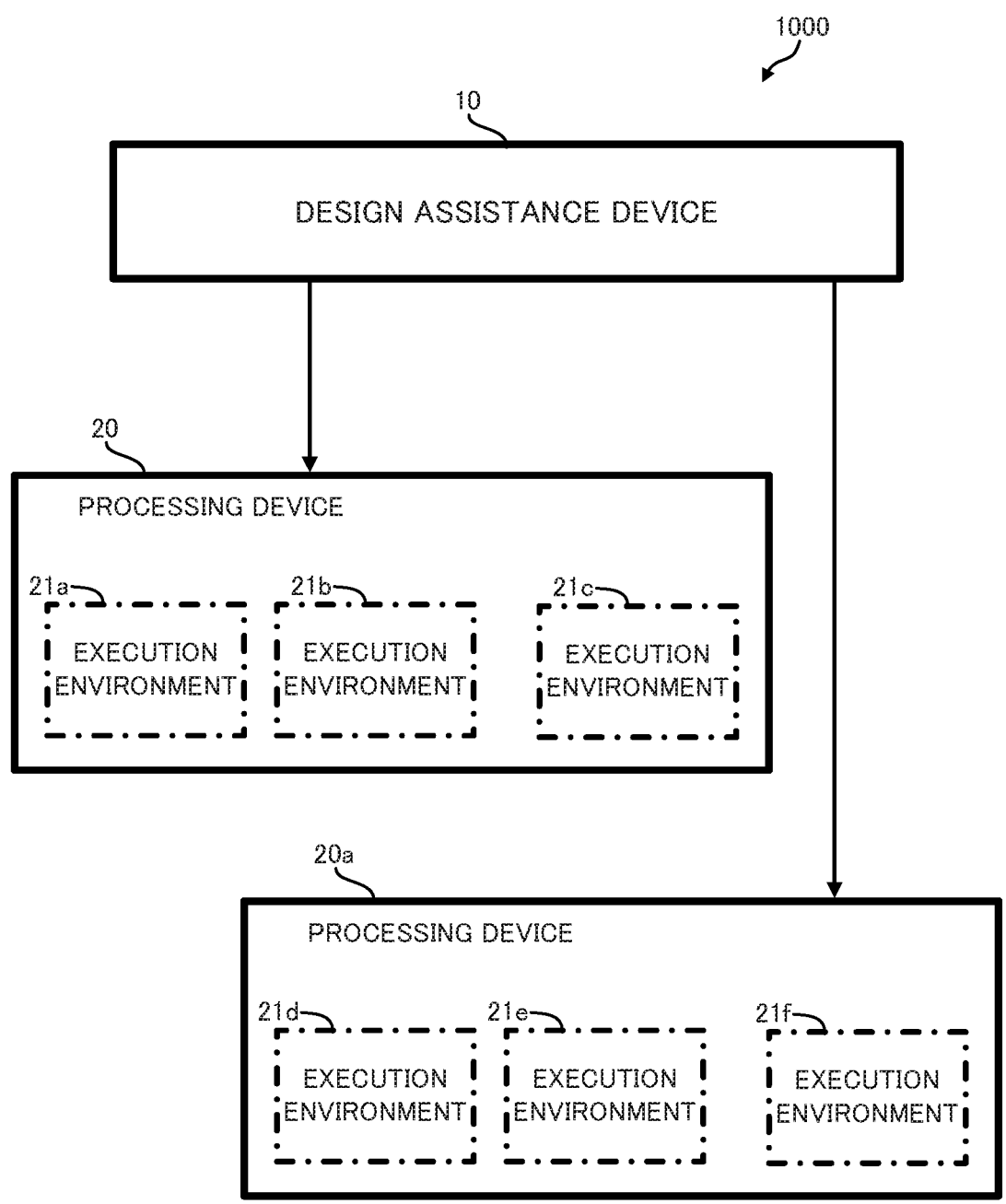
FIG. 13 illustrates a modified example in which a plurality of the processing device according to the embodiment is arranged.

For example, although the above-described embodiment employs one processing device 20, such configuration is not limiting. Execution of the content of the processing code 102 may be achieved in the execution environments 21*a*, 21*b* and 21*c* that are provided on the processing device 20 and in execution environments 21*d*, 21*e* and 21*f* that are provided on a processing device 20*a*, as illustrated in FIG. 13.

Furthermore, although the processing system 1000 of the above-described embodiment includes the server 40, such configuration is not limiting. The processing system 1000 may omit the server 40 when the user 100 can prepare software components and OSs to be used for providing the execution environments.

Furthermore, although the communication code generated by the communication code generator 132 of the present embodiment is a source code, such configuration is not limiting, and the communication code may be a software component.

Furthermore, although the design assistance device 10 according to the above-described embodiment includes the converter 14 that converts code format, such configuration is not limiting, and the design assistance device 10 may omit the converter 14. For example, when the processing code 102 is described in an interpreter-type language or in a low-level language, the design assistance device 10 that omits the converter 14 can achieve effects similarly to those achieved in the above-described embodiment.

Furthermore, although the outputter 15 of the design assistance device 10 provides the execution environments based on the design information 101 in the above-described embodiment, such configuration is not limiting. The design assistance device 10 may output the executable files to the processing device 20 on which a plurality of execution environments is pre-provided.

Furthermore, although processing that inputs the design information 101 every time before inputting the processing code 102 is described in the aforementioned embodiment, such configuration is not limiting. The processing in and after step S2 relating to the processing code 102 may be repeatedly performed by utilizing the design information 101 that is set once (refer to FIG. 7).

Furthermore, although the aforementioned embodiment describes selecting an execution environment corresponding to a most-frequently-used library as an execution environment in which a module is executed, such configuration is not limiting. For example, an execution environment in which a module is executed may be selected by setting a weighting factor for each library, obtaining a weighted sum for each execution environment, and selecting an execution environment with the largest weighted sum. FIG. 14 illustrates an example of setting a weighting factor for each library. Here, FIG. 10 specifies, as the index values, that the "I/O access library" is used 6 times, the "database library" is used 3 times, and the "GUI library" is used 2 times. Thus, the weighted sum for the execution environment 21*a* obtained with reference to FIG. 14 in view of FIG. 10 is 6.0 (=6×1.0). Similarly, the weighted sum for the execution environment 21*b* is 4.5 (=3×1.5), and the weighted sum for the execution environment 21*c* is 7.6 (=2×3.8). The weighted sum for the execution environment 21*d* is zero. The divider 131 may select, in view of the obtained weighted sums, the execution environment 21*c* with the largest weighted sum.

Furthermore, although numbers of times libraries are used are employed as the index values in the above-described embodiment, such configuration is not limiting. The index values may be a number of lines or a number of letters included in each module.

Furthermore, although functions included in the processing code 102 are treated as modules in the above-describe embodiment, such configuration is not limiting. When the processing code 102 includes a plurality of files each containing a source code and each of the plurality of files contains a plurality of functions, the plurality of files may be treated as modules.

Furthermore, although the processing code 102 is a source code in the above-described embodiment, such configuration is not limiting. The processing code 102 may be, for example, a control language such as ladder logic or a profile.

Furthermore, although the design information 101 in the above-describe embodiment specifies the partial processing that is included in a module and prioritized for execution in a specific execution environment different from an execution environment determined for execution of the module, such configuration is not limiting. The communication code generator 132 may, for example, refer to specifications of the execution environments, extract libraries that cannot be executed in an execution environment employed for execution of the module, and determine other execution environments in which the extracted libraries can be executed.

Furthermore, although the design information 101 specifies the communication methods used in communications among the execution environments, such configuration is not limiting. All the communications among the execution environments may be performed, for example, by use of the shared memory when the processing device 20 includes a RAM with sufficient capacity.

Furthermore, dedicated hardware or an ordinary computer system can also achieve the functions of the design assistance device 10.

For example, distributing the program P1 to be executed by the processor 31 by storing the program P1 in a computer-readable recording medium and installing the program P1 in a computer can achieve a device for executing the above-described processing. Examples of such recording media are a flexible disk, a Compact Disc Read-Only Memory (CD-ROM), a Digital Versatile Disc (DVD), and a Magneto-Optical (MO) Disc.

Furthermore, the program P1 may be stored in a disk device of a server device on a communication network such as the Internet, for example, superimposed on a carrier wave, and downloaded to a computer.

Furthermore, starting and executing the program P1 while transferring the program P1 via the communication network can also achieve the above-described processing.

Furthermore, the above-described processing can also be achieved by causing all or part of the program P1 to be executed on the server device, and executing the program P1 while the computer transmits and receives information related to the processing through the communication network.

In the case where the above-described functions are implemented by an Operating System (OS) or implemented by cooperation between the OS and an application, for example, distribution of only a portion other than the OS by storing the portion in a medium, or by downloaded to a computer, is permissible.

The means for achieving the functions of the design assistance device 10 is not limited to software, and dedicated hardware including circuits may achieve some or all of the functions.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is suitable for causing dispersal, to a plurality of execution environments, processing for causing execution by a processing device.

REFERENCE SIGNS LIST

1000 Processing system
100 User
101 Design information
102 Processing code
10 Design assistance device
11 Acquirer
12 Analyzer
13 Code generator
131 Divider
132 Communication code generator
14, 14a, 14b, 14c Converter
15 Outputter
16 Storage
20, 20a Processing device
21, 21a, 21b, 21c, 21d, 21e, 21f Execution environment
22 Executable file
23 Communicator
24 Hypervisor
25 Hardware
31 Processor
32 Main storage
33 Auxiliary storage
34 Inputter
35 Outputter
36 Communicator
37 Internal bus
40 Server
41 Software component
42 OS
P1 Program

The invention claimed is:

1. A design assistance device that assists designing for causing a processing device to execute processing, the design assistance device comprising processing circuitry configured to perform as:
    an acquirer to acquire a processing code describing content of the processing;
    a divider to divide the processing code into a plurality of modules and determine, for each of the plurality of modules and based on a frequency of use of a library, an execution environment in which the corresponding module is to be executed, from among a plurality of execution environments provided on the processing device;
    a communication code generator to generate, when a module of the plurality of modules includes partial processing prioritized for execution in a second execution environment other than a first execution environment determined for execution of the module, a communication code for communication between the first execution environment and the second execution environment to execute the partial processing in the second execution environment; and
    an outputter to output the plurality of modules and the communication code to the processing device.

2. The design assistance device according to claim 1, wherein the processing circuitry is further configured to perform as a converter to convert a format of each module and a format of the communication code into executable format, wherein
    the processing code and the communication code are each source code.

3. The design assistance device according to claim 2, wherein
    the design assistance device is connected to a server, and the outputter acquires, from the server, data for causing the processing device to execute the processing described in the processing code, and outputs, to the processing device, the data, the plurality of modules, and the communication code.

4. The design assistance device according to claim 2, wherein the divider determines, for each of the plurality of modules, an execution environment in which the corresponding module is to be executed, based on an index value obtained from content of the processing described in the module.

5. The design assistance device according to claim 2, wherein
    the partial processing is processing that uses the library,
    the acquirer acquires design information associating the library and a communication method with each other,
    the communication code generator generates a communication code for communication via a communication method that is associated with the library used in the partial processing.

6. The design assistance device according to claim 1, wherein
    the design assistance device is connected to a sever server, and
    the outputter acquires, from the server, data for causing the processing device to execute the processing described in the processing code, and outputs, to the processing device, the data, the plurality of modules, and the communication code.

7. The design assistance device according to claim 6, wherein the divider determines, for each of the plurality of modules, an execution environment in which the corresponding module is to be executed, based on an index value obtained from content of the processing described in the module.

8. The design assistance device according to claim 6, wherein
the partial processing is processing that uses the library,
the acquirer acquires design information associating the library and a communication method with each other,
the communication code generator generates a communication code for communication via a communication method that is associated with the library used in the partial processing.

9. The design assistance device according to claim 1, wherein the divider determines, for each of the plurality of modules, an execution environment in which the corresponding module is to be executed, based on an index value obtained from content of the processing described in the module.

10. The design assistance device according to claim 9, wherein the index value indicates the frequency of use of h library in the processing described in the module.

11. The design assistance device according to claim 10, wherein
the partial processing is processing that uses the library,
the acquirer acquires design information associating the library and a communication method with each other,
the communication code generator generates a communication code for communication via a communication method that is associated with the library used in the partial processing.

12. The design assistance device according to claim 9, wherein
the partial processing is processing that uses the library,
the acquirer acquires design information associating the library and a communication method with each other,
the communication code generator generates a communication code for communication via a communication method that is associated with the library used in the partial processing.

13. The design assistance device according to claim 1, wherein
the partial processing is processing that uses the library,
the acquirer acquires design information associating the library and a communication method with each other,
the communication code generator generates a communication code for communication via a communication method that is associated with the library used in the partial processing.

14. The design assistance device according to claim 1, wherein each of the plurality of modules is configured to execute on a same processing device.

15. The design assistance device according to claim 1, wherein each of the plurality of modules is configured to execute using a different Operating System (OS).

16. A design assistance method comprising
by a computer, dividing a processing code describing content of processing into a plurality of modules and determining, for each of the plurality of modules and based on a frequency of use of a library, an execution environment in which the corresponding module is to be executed, from among a plurality of execution environments;
by the computer, generating, when a module of the plurality of modules includes partial processing prioritized for execution in a second execution environment other than a first execution environment determined for execution of the module, a communication code for communication between the first execution environment and the second execution environment to execute the partial processing in the second execution environment; and
by the computer, outputting the plurality of modules and the communication code.

17. A non-transitory computer-readable recording medium storing a program for causing a computer to:
divide a processing code describing content of processing into a plurality of modules and determine, for each of the plurality of modules and based on a frequency of use of a library, an execution environment in which the corresponding module is to be executed, from among a plurality of execution environments;
generate, when a module of the plurality of modules includes partial processing prioritized for execution in a second execution environment other than a first execution environment determined for execution of the module, a communication code for communication between the first execution environment and the second execution environment to execute the partial processing in the second execution environment; and
output the plurality of modules and the communication code.

* * * * *